(12) United States Patent
Chien

(10) Patent No.: US 8,115,997 B1
(45) Date of Patent: Feb. 14, 2012

(54) PROJECTION SCREEN

(76) Inventor: Martin Chien, Kaohsiung (TW)

( * ) Notice: Subject to any disclaimer, the term of this patent is extended or adjusted under 35 U.S.C. 154(b) by 0 days.

(21) Appl. No.: 13/065,793

(22) Filed: Mar. 30, 2011

(51) Int. Cl.
*G03B 21/60* (2006.01)

(52) U.S. Cl. ....................................... 359/459

(58) Field of Classification Search .......... 359/449, 359/459, 455, 452–453
See application file for complete search history.

(56) References Cited

U.S. PATENT DOCUMENTS

| 4,190,320 A * | 2/1980 | Ferro | 359/459 |
| 4,732,441 A * | 3/1988 | Cheng | 359/459 |
| 6,144,491 A * | 11/2000 | Orikasa et al. | 359/459 |
| 7,796,331 B2 * | 9/2010 | Mizushima et al. | 359/449 |
| 2004/0240054 A1 * | 12/2004 | Aiura et al. | 359/455 |

* cited by examiner

*Primary Examiner* — Christopher Mahoney
(74) *Attorney, Agent, or Firm* — Clifford W. Browning; Krieg DeVault LLP

(57) ABSTRACT

A projection screen includes: a lenticular layer including rear and front surfaces, the front surface being formed with a plurality of convex microstructures; a reflecting layer formed on the front surface of the lenticular layer and having a plurality of convex surfaces in conformity to surfaces of the convex microstructures; and a diffusion layer disposed on the reflecting layer oppositely of the lenticular layer, and including a plurality of black nanoparticles dispersed therein.

7 Claims, 5 Drawing Sheets

PROJECTION SCREEN

BACKGROUND OF THE INVENTION

1. Field of the Invention

This invention relates to a projection screen, more particularly to an optical projection screen that has a relatively low light reflection with respect to ambient light, relatively high black-and-white contrast image, relatively high gain, and a half gain viewing angle of greater than 175 degrees.

2. Description of the Related Art

Referring to FIG. 1, a conventional projection screen 1 is usually used in a movie theater, a meeting room, a home theater, etc., and is able to diffuse and reflect a projector light 12 from a projector 11 to display an image thereon. When the projector light 12 goes in a constant direction with a constant luminous flux, a ratio of a maximum reflected luminance on the projection screen 1 to a standard luminance of the projector light 12 is defined as "maximum luminance coefficient" (i.e., again of the projection screen 1). Along a horizontal direction, the luminance coefficient or gain decreases from a center point on the projection screen 1. A half gain viewing angle refers to a viewing angle at which the reflective luminance becomes one-half of the maximum reflected luminance.

Because the conventional projection screen 1 is likely to reflect or diffuse ambient light, it is preferably used in a dark environment to generate a better visual effect. However, it is difficult for viewers to write in such condition when the projection screen 1 is used for teaching or in a meeting. Therefore, the conventional projection screen 1 needs further improvement.

Referring to FIG. 2, U.S. Pat. No. 6,747,796 discloses a projection screen 100 including a substrate 10 and a layer of transparent beads 13 coated on the substrate 10. The projector light passes through the transparent beads 13 and is refracted to the viewers. By virtue of the transparent beads 13, the gain of the projection screen 100 can be enhanced. However, since each of the transparent beads 13 has a spherical structure that is likely to refract the ambient light, the half gain viewing angle of the projection screen 100 ranges from 40 degrees to 70 degrees. The viewable angle of the projection screen 100 is too small for use in a place where many people are present.

Furthermore, while the conventional projection screens 1, 100 may reflect or refract ambient light, they can not function to enhance color saturation and black-and-white contrast. Therefore, images displayed by the conventional projection screens 1, 100 have poor color saturation and black-and-white contrast.

SUMMARY OF TEE INVENTION

Therefore, an object of the present invention is to provide a projection screen that can overcome the aforesaid drawbacks associated with the prior art.

Accordingly, a projection screen of this invention comprises:

a lenticular layer including rear and front surfaces, the front surface being formed with a plurality of convex microstructures;

a reflecting layer formed on the front surface of the lenticular layer and having a plurality of convex surfaces in conformity to surfaces of the convex microstructures; and a diffusion layer disposed on the reflecting layer oppositely of the lenticular layer, and including a plurality of black nanoparticles dispersed therein.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENTS

Figure 1:
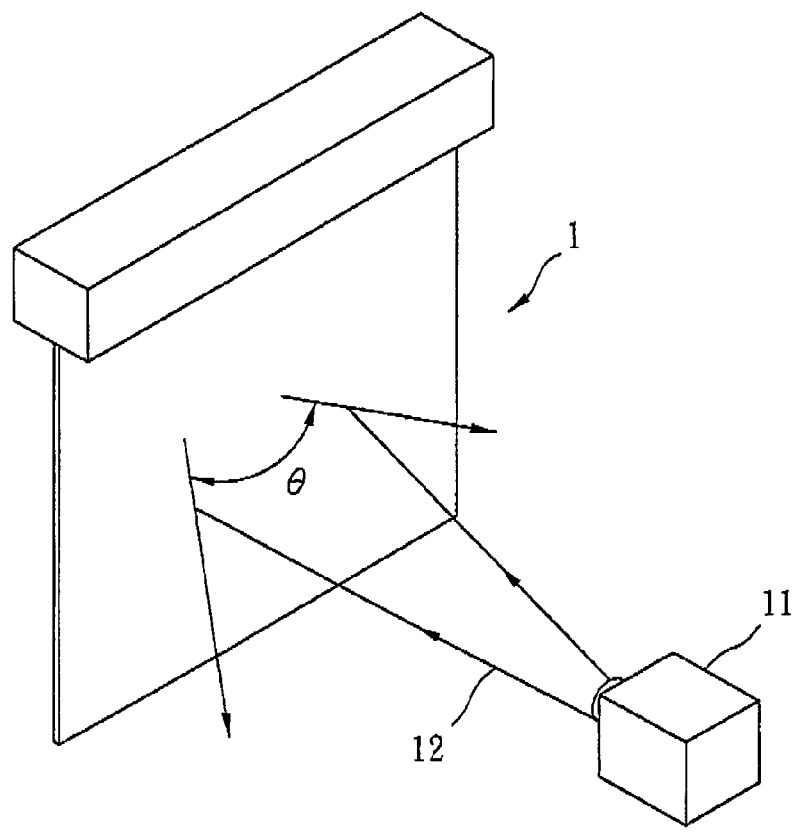
FIG. 1 is a perspective view illustrating a conventional projection screen.
Figure 2:
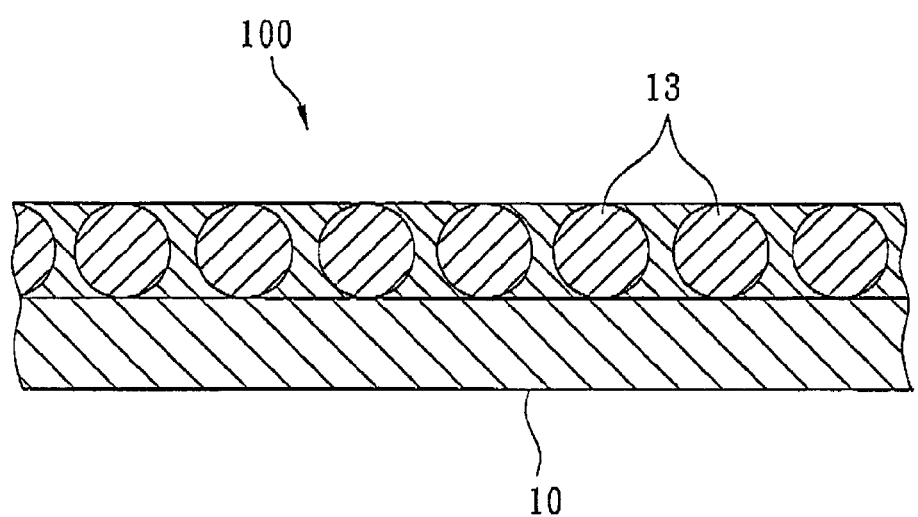
FIG. 2 is a cross-sectional view illustrating a conventional projection screen disclosed in U.S. Pat. No. 6,747,796.
Figure 3:
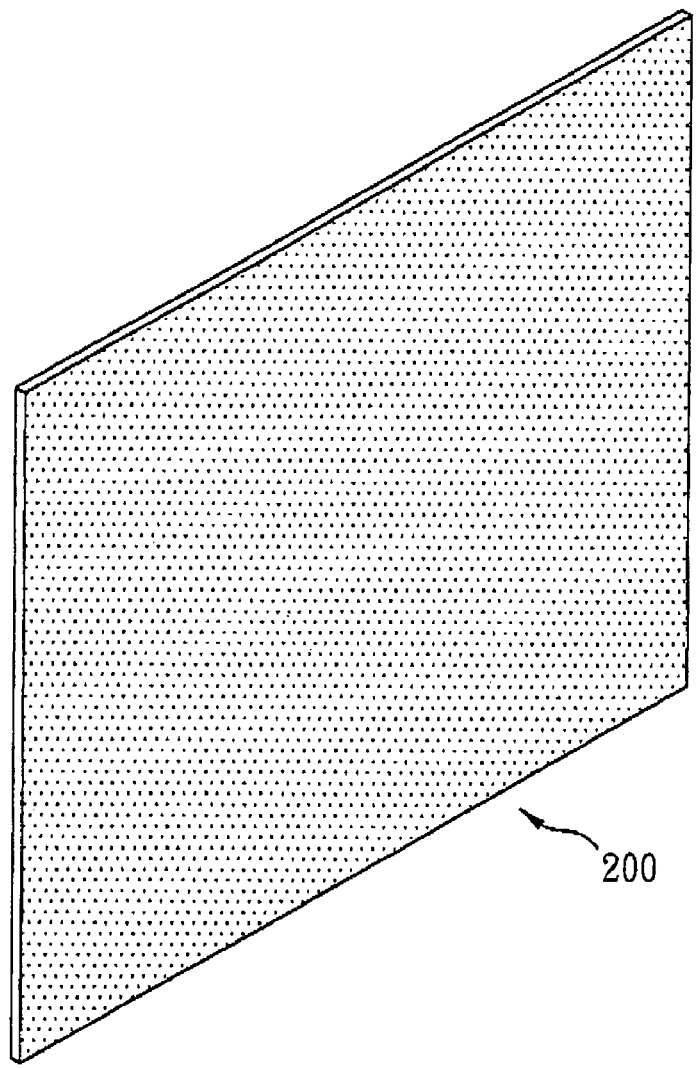
FIG. 3 is a perspective view illustrating the preferred embodiment of an optical projection screen of this invention.
Figure 4:
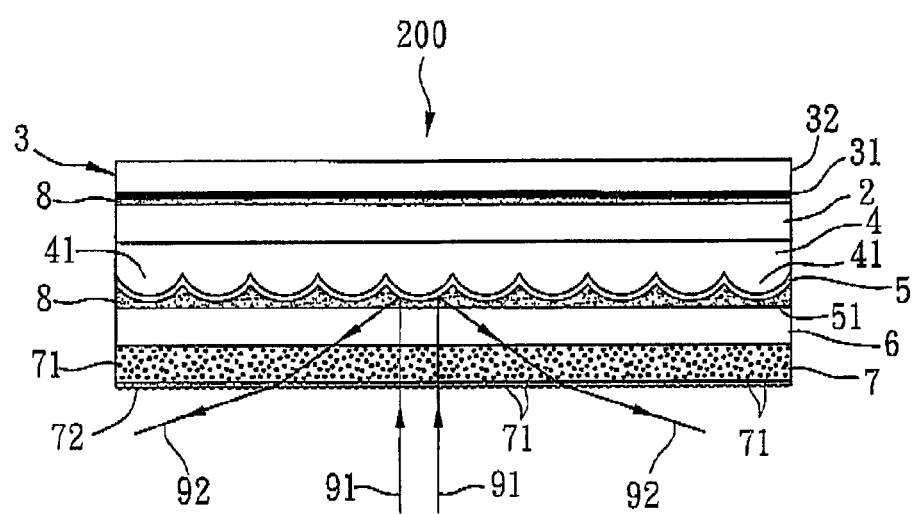
FIG. 4 is a cross-sectional view of the optical projection screen shown in FIG. 3.

Referring to FIGS. 3 and 4, the preferred embodiment of an optical projection screen 200 according to this invention comprises a lenticular substrate 2, a base layer 3 disposed at a rear surface of the lenticular substrate 2, a lenticular layer 4 bonded to a front surface of the lenticular substrate 2, a reflecting layer 5 formed on the lenticular layer 4, a light-transmissive substrate 6 disposed on the reflecting layer 5, a diffusion layer 7 formed on the light-transmissive substrate 6, a hard coating 72 formed on a front surface of the diffusion layer 7, and two adhesive layers 8. The base layer 3 includes a non-transmissive coating 31 adhered to the rear surface of the lenticular substrate 2 through one of the adhesive layers 8, and a protective substrate 32 bonded to the non-transmissive coating 31 and opposite to the lenticular substrate 2. The non-transmissive coating 31 can prevent light loss caused by transmission of incident light 91 through the lenticular substrate 2 and can also prevent light incident on a rear side of the optical projection screen 200 from interfering with projected light. The protective substrate 32 is stain-resistant and is easily cleanable. Preferably, both of the protective substrate 32 and the non-transmissive coating 31 are black.

The lenticular layer 4 includes rear and front surfaces, and the front surface thereof is formed with a plurality of convex microstructures 41. A center-to-center distance between two adjacent convex microstructures 41 ranges from 10 µm to 100 µm.

The reflecting layer 5 is formed on the front surface of the lenticular layer 4 from a metal material that has relatively high reflectivity. The thickness of the reflecting layer 5 ranges from 10 nm to 100 nm. Non-limiting examples of the metal material include silver and aluminum. In the preferred embodiment, the reflecting layer 5 is made of silver. The reflecting layer 5 has a plurality of convex surfaces 51 in conformity to the surfaces of the convex microstructures 41, and thus can reflect the incident light 91, alter the angle of the reflected exiting light 92, and enhance a gain of the exiting light 92.

The light-transmissive substrate 6 is adhered to the front side of the reflecting layer 5 through the other one of the adhesive layers 8. The diffusion layer 7 is formed on the light-transmissive substrate 6, and has a relatively high transmittance for transmission of the exiting light 92. The diffusion layer 7 includes a plurality of black nanoparticles 71 in an amount of 0.1% (v/v) to 1% (v/v) based on the total volume of the diffusion layer 7. The hard coating 72 is scratch-resistant and anti-glare, and has a rough front surface formed using a microstructure-forming technique. By adjusting the volume percentage of the black nanoparticles 71, an image displayed by the optical projection screen 200 may have different color saturation and black-and-white contrast based on user requirements.

If the volume percentage of the black nanoparticles 71 in the diffusion layer 7 is overly high (>1%), the exiting light 92 will result in a dull image. If the volume percentage of the black nanoparticles 71 is overly low (<0.1%), the exiting light 92 will result in an overly bright image that has no effective contrast. Besides, with the rough front surface of the hard coating 72, the exiting light 92 may be further dispersed to enlarge the viewable angle of the optical projection screen 200. At the same time, entry of ambient light into the diffusion layer 7, which may interfere with optical paths of the incident light 91 and the exiting light 92, can be reduced. It should be noted that the percentage and size of the black nanoparticles shown in FIG. 4 are only for convenience of illustrating and explaining, and are not drawn based on the actual ones.

The two adhesive layers 8 may be pressure-sensitive adhesive layers, and have relatively high light transmittance.

All of the protective substrate 32, the lenticular substrate 2, and the light-transmissive substrate 6 are made of a flexible material. Accordingly, the optical projection screen 200 of this invention is easy to roll up for storage or carrying, and can be assembled into different configurations for different applications.

Figure 5:
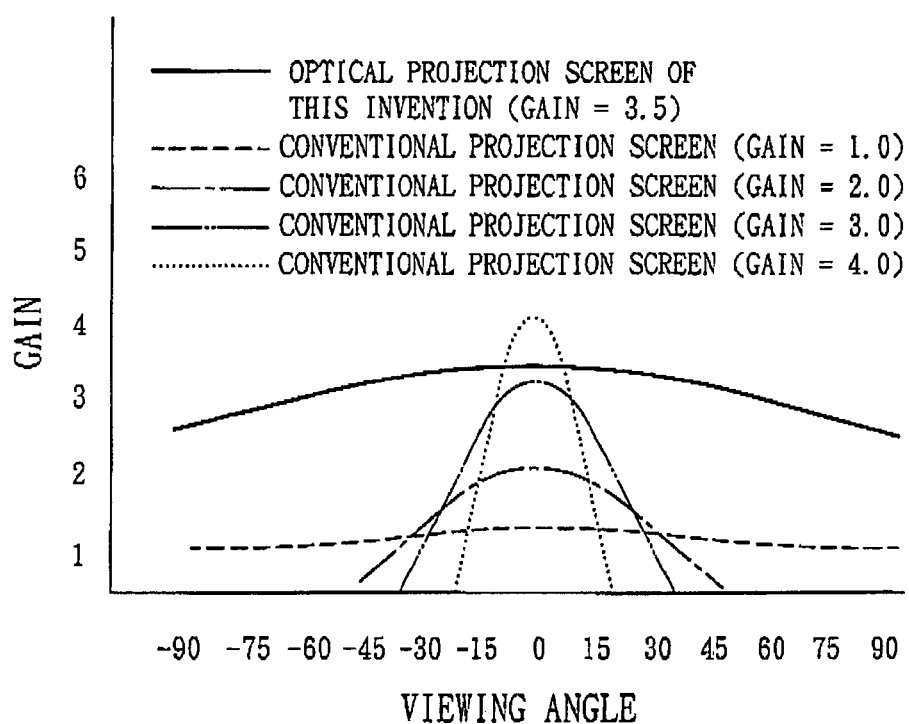
FIG. 5 is a plot of gain as a function of viewing angle for the optical projection screen of the present invention and for conventional projection screens.

FIG. 5 is a plot for comparing data of gains/viewing angles. A maximum luminance coefficient measured along a horizontal direction is defined as a gain. Along the horizontal direction of the optical projection screen 200, the luminance coefficient decreases from a center point on the projection screen 200. A viewing angle, at which the reflective luminance becomes one-half of the maximum reflected luminance, is defined as a viewing angle.

In FIG. 5, the X-axis represents the viewing angle, and the Y-axis represents the gain. Based on experiments, in conventional optical projection screens, the viewing angle decreases with an increase of the gain. For example, when the gain is 4, the half gain view angle is 30 degrees (±15 degrees). With the specific structure of the optical projection screen 200 of this invention, the half gain viewing angle can be increased to greater than 175 degrees (±87.5 degrees) even when the gain is as high as 3.5.

In summary, the preferred embodiment of the optical projection screen 200 of this invention includes the following advantages:

1. Scratch-Resistant and Anti-Glare

Since the hard coating 72 has the scratch-resistant rough front surface, the optical projection screen 200 is scratch-resistant, entry of ambient light into the diffusion layer 7 can be reduced, interference of the ambient light with the projector light can be alleviated, and the optical projection screen 200 can be used in either dark or bright conditions.

2. High Gain, and Better Contrast and Color Saturation Image

With the convex surfaces 51 of the reflecting layer 5, the gain of the exiting light 92 can be enhanced. Due to the use of the black nanoparticles 71 in the diffusion layer 7, better black-and-white contrast and color saturation can be obtained.

3. Large Viewable Angle

The exiting light 92 can be scattered in a relatively wide angle by virtue of the convex surfaces 51 of the reflecting layer 5 and the diffusion layer 7. Thus, regardless of whether or not the viewer is at a location immediately in front of the optical projection screen 200, the image can be clearly observed.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A projection screen, comprising:
    a lenticular layer including rear and front surfaces, said front surface being formed with a plurality of convex microstructures;
    a reflecting layer formed on said front surface of said lenticular layer and having a plurality of convex surfaces in conformity to surfaces of said convex microstructures;
    a diffusion layer disposed on said reflecting layer oppositely of said lenticular layer, and including a plurality of black nanoparticles dispersed therein;
    a lenticular substrate;
    a light-transmissive substrate;
    an adhesive layer, said rear surface of said lenticular layer being bonded to said lenticular substrate, said adhesive layer being disposed between said light-transmissive substrate and said reflecting layer to adhere said light-transmissive substrate to said reflecting layer, said diffusion layer being formed on said light-transmissive substrate and opposite to said adhesive layer;
    a protective substrate;
    a non-transmissive coating formed on said protective substrate; and
    another adhesive layer disposed between said non-transmissive coating and said lenticular substrate to adhere said non-transmissive coating to said lenticular substrate.

2. The projection screen of claim 1, wherein a center-to-center distance between two adjacent ones of said convex microstructures ranges from 10 μm to 100 μm.

3. The projection screen of claim 1, wherein said diffusion layer includes 0.1% (v/v) to 1% (v/v) of said black nanoparticles based on the total volume of said diffusion layer.

4. The projection screen of claim 1, further comprising a hard coating formed on a front surface of said diffusion layer opposite to said reflecting layer, said hard coating being scratch-resistant and having a rough front surface.

5. The projection screen of claim 1, wherein said reflecting layer is made of a metal material, and has a thickness ranging from 10 nm to 100 nm.

6. The projection screen of claim 5, wherein said metal material is one of silver and aluminum.

7. The projection screen of claim 1, wherein both of said protective substrate and said non-transmissive coating are black.

* * * * *